United States Patent [19]

Brew

[11] Patent Number: 5,397,230
[45] Date of Patent: Mar. 14, 1995

[54] VENT APPARATUS FOR AN INJECTION MOLD

[75] Inventor: James K. Brew, Greenwood, Ind.

[73] Assignee: GenCorp Inc., Fairlawn, Ohio

[21] Appl. No.: 102,169

[22] Filed: Aug. 4, 1993

[51] Int. Cl.$^6$ .............................................. B29C 45/34
[52] U.S. Cl. ................................... 425/546; 264/102; 425/812
[58] Field of Search ............... 425/135, 149, 546, 812; 264/39, 40.1, 40.3, 101, 102

[56] References Cited

U.S. PATENT DOCUMENTS

| | | |
|---|---|---|
| 2,318,031 | 5/1943 | Tucker . |
| 2,490,625 | 12/1949 | Hall . |
| 2,737,686 | 3/1956 | Harkenrider . |
| 2,862,239 | 12/1958 | Pollard et al. . |
| 2,885,268 | 5/1959 | Breer et al. . |
| 2,904,830 | 9/1959 | Mulrooney, Jr. . |
| 3,299,475 | 1/1967 | Carlson et al. . |
| 3,608,150 | 9/1971 | Laufer et al. . |
| 3,723,037 | 3/1973 | Formo . |
| 3,843,289 | 10/1974 | Taylor . |
| 3,885,618 | 5/1975 | Hodler . |
| 3,975,128 | 8/1976 | Schluter . |
| 4,091,069 | 5/1978 | Allen . |
| 4,314,765 | 2/1982 | Hotz . |
| 4,368,028 | 1/1983 | Grish et al. . |
| 4,386,899 | 6/1983 | Cook . |
| 4,422,840 | 12/1983 | Posch et al. . |
| 4,443,177 | 4/1984 | Modur et al. . |
| 4,538,666 | 9/1985 | Takeshima et al. . |
| 4,611,983 | 9/1986 | Bielfeldt . |
| 4,900,242 | 2/1990 | Maus et al. . |
| 4,938,274 | 7/1990 | Iwamoto et al. . |
| 4,997,026 | 3/1991 | Ozeki et al. . |
| 5,187,001 | 2/1993 | Brew . |

OTHER PUBLICATIONS

Webster's Ninth New Collegiate Dictionary 1986, p. 954.

Primary Examiner—Tim Heitbrink
Attorney, Agent, or Firm—Robert F. Rywalski; Daniel J. Hudak

[57] ABSTRACT

A closed injection mold for molding liquid resins into molded plastic articles containing at least one vent apparatus having a reciprocating vent pin operative to retract to open the vent opening and extend to close the vent opening. Each vent apparatus is responsive to a full resin level in the mold cavity to close the vent opening. When the vent opening is closed, cleansing fluid is automatically circulated through the debris charge line of the vent apparatus to clear the venting channels prior to the resin debris hardening.

8 Claims, 3 Drawing Sheets

VENT APPARATUS FOR AN INJECTION MOLD

TECHNICAL FIELD

This invention relates to a vent apparatus and system for molding and particularly to a venting unit for liquid molding processes such as structural reaction injection molding (SRIM), resin transfer molding (RTM), and reaction injection molding (RIM).

BACKGROUND

Liquid molding processes require molding resins to be injected into a closed mold in a liquid state where the liquid resins are hardened into a molded plastic article. During the injecting step, air in the mold is displaced and forced out of the mold cavity through vents. The displaced air is ordinarily vented to the exterior of the closed mold. If air is not permitted to escape or otherwise ventilate from the mold cavity, the non-ventilated air will inhibit resin flow within the mold cavity, become entrained in the fluid resin, and remain trapped within the molded article, possibly causing a defective or scrap molded article.

Prior systems for venting closed molds ordinarily consist of channels cut into the mold through the tool parting line, or hoses from vent sprues, or the air is simply allowed to bleed out under pressure through the perimeter seal of the mold.

The prior art processes, however, frequently release displaced gases and waste material into the environment. Further operating problems include the inability to accurately and consistently control filling of the mold cavity as well as the inability to build constant pressure in the mold cavity due to uncontrolled open ventilation. Also, the prior art venting apparatus generally do not include self-contained cleaning means operative to clean the mold means of resin or other waste debris after the vent is closed.

SUMMARY OF THE INVENTION

A closed injection mold for molding liquid resin is fitted with at least one vent apparatus for expelling air displaced from within the closed mold during the resin injection process. The vent apparatus comprises a venting tube or nozzle communicating with a vent opening in the mold where the venting tube is fitted with a reciprocating closure means adapted to close the vent opening in response to complete filling of the mold cavity with liquid resin. The vent apparatus also comprises a purge channel containing an entrance channel and a debris discharge channel, both of which are interconnected to the vent tube. During the molding cycle and while the vent opening is closed, the entrance purge channel transports cleansing fluid, such as air or organic solvent, to entrance purge the debris discharge channel of resin particles and other debris expelled from the mold cavity during charging of the liquid resin to the mold cavity.

In accordance with the process of the present invention, liquid resin is injected into the closed mold cavity while the reciprocating closure means is retracted and the vent tube is maintained opened. This permits air displaced from the mold cavity during resin filling of the mold to vent freely through the vent tube and exit to the atmosphere through a resin discharge channel. Upon complete filling of the mold cavity with liquid molding resin, the reciprocating closure means is extended to close the vent opening. A plurality of vents can be independently operated and sequenced to close in order to achieve complete and proper filling of the mold cavity. Closing of the vents permits internal cavity pressure to build up as desired. Meanwhile, upon closing of the vent openings, cleansing fluid is caused to circulate through the entrance purge channel and the debris discharge channel to flush the venting apparatus of resin particles and other debris, which is particularly advantageous and important when thermosetting liquid molding resins are used. The venting apparatus of this invention advantageously operates independently of closing the mold and mold internal pressure, and preferably is positioned in line with the resin material flow within the mold cavity. The self-contained, self-cleaning venting apparatus can be manually or automatically activated during the molding cycle in preparation for the next resin injection filling cycle. The venting apparatus is particularly useful with the molding of thermosetting liquid resin such as polyesters, vinyl or acrylic esters, ethylenically unsaturated resins, urethanes, epoxy resins, and the like.

DETAILED DESCRIPTION OF THE INVENTION

Figure 1:
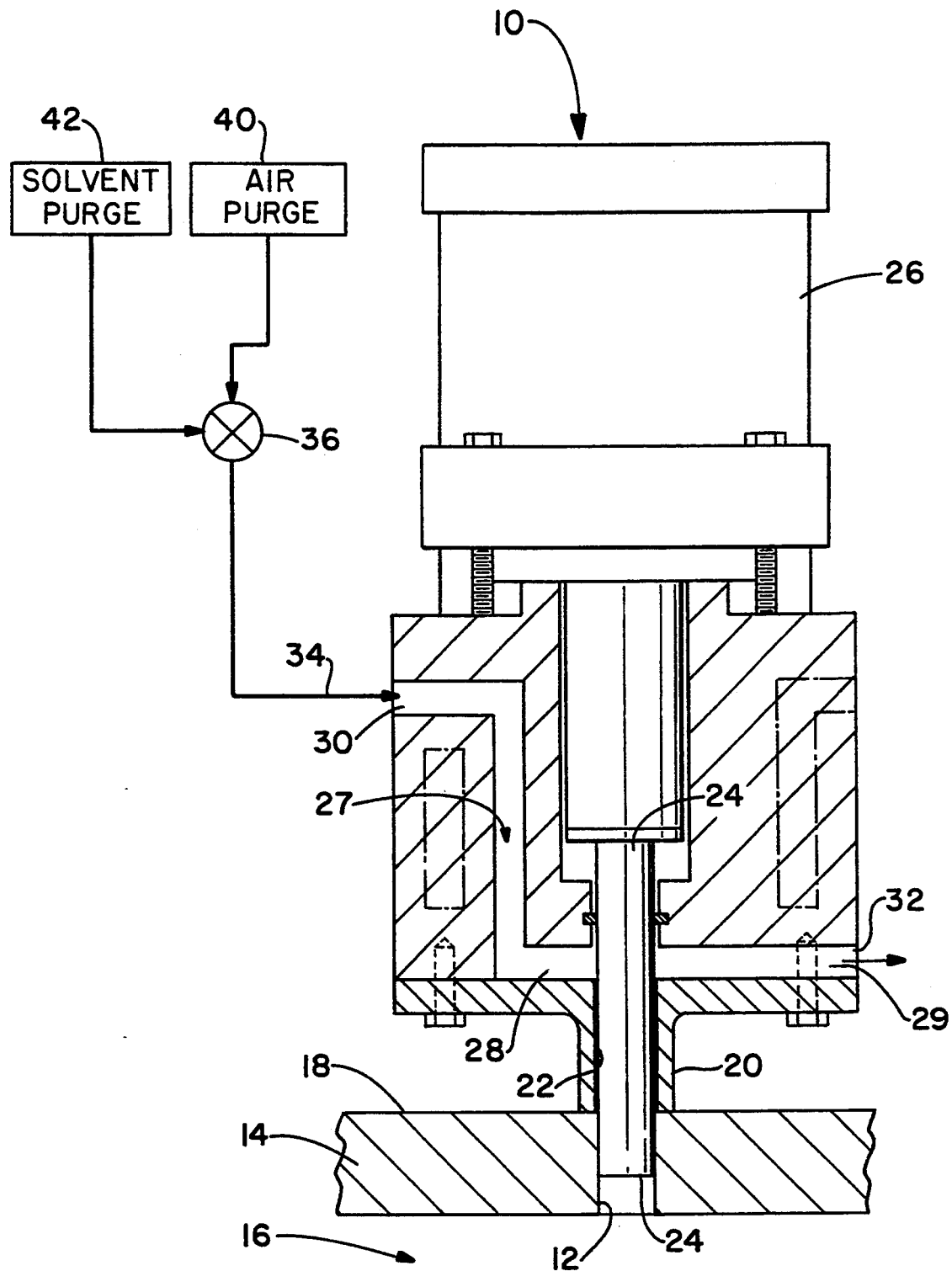
FIG. 1 is a front elevation view of the vent apparatus of the present invention shown partially in section to better illustrate the vent in a closed vent position.

Referring now to the drawings and more particularly to FIG. 1, a venting apparatus 10 is shown operatively interconnected to a vent opening 12 in closed mold 14, which is particularly useful for liquid injection molding of plastic articles within mold cavity 16.

Figure 2:
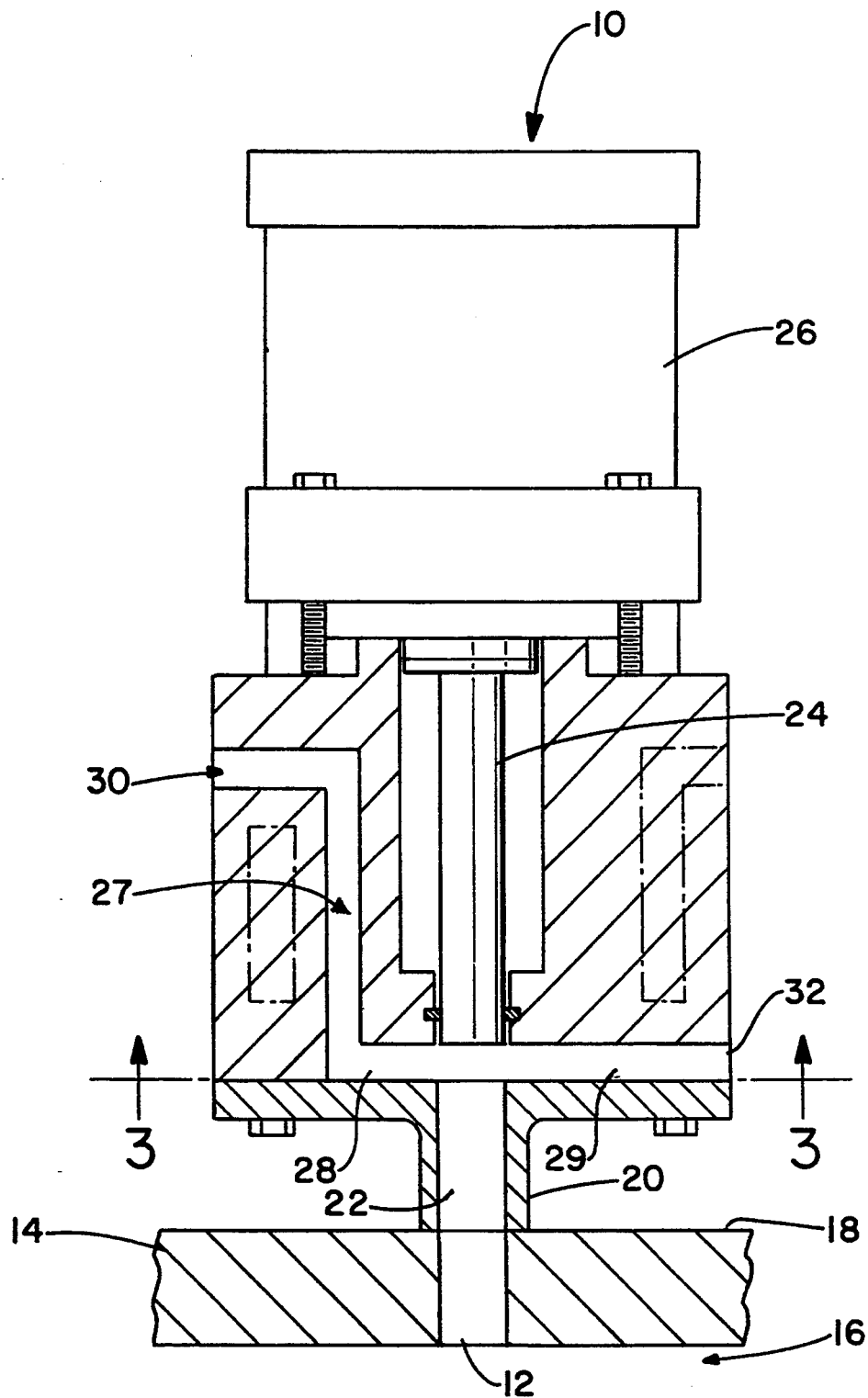
FIG. 2 is a view similar to FIG. 1 but showing the vent apparatus in an open position.

Venting apparatus 10 comprises a hollow vent tube or nozzle 20 having an interior vent channel 22 with a bore diameter essentially the same as the bore diameter of the vent opening 12 in the closed mold 14. The interior vent channel 22 is adapted to slidably engage a reciprocating vent pin 24 operative to extend downwardly as shown in FIG. 1 to close the vent opening 12 and operative to retract upwardly as shown in FIG. 2 to open the vent opening 12. The reciprocating vent pin 24 essentially has the same diameter as the vent channel and is operatively interconnected to a reciprocating actuating means such as a pneumatic cylinder 26. Hence, reciprocating movement of the vent pin 24 is operative to open the vent opening 12 to vent the mold cavity of displaced air during the liquid resin charging of the mold cavity 16 and subsequently close the vent opening 12 to maintain the liquid resin within the mold cavity 16 during the molding cycle.

Vent tube 20 can be secured to the mold 14 at the parting line 18 (exterior mold surface), as shown in FIGS. 1 and 2, which produces a sprue on the molded part that remains with the molded part when removed from the mold. Alternatively, the nozzle 20 can be inserted through the mold wall 14 and be flush with the interior wall, not shown.

Figure 3:
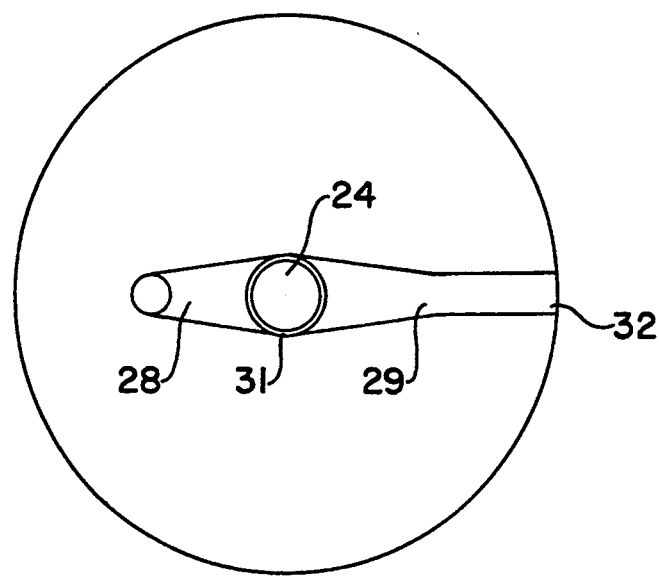
FIG. 3 is a sectional view taken along lines 3–3 of FIG. 2.

Referring now to FIGS. 1 and 2, the upwardly extending vent tube 20 is connected to a purging channel 27 communicating with the vent channel 22. The purging channel 27 has an input opening 30, an entrance channel 28, and a discharge opening 32 where channel section 29 also serves as a mold and debris discharge port. Debris discharge channel 29 can generally be horizontal, as shown, or have a vertical leg such that it is symmetrical to the input opening 30 and entrance channel 28. The purging channel 27 is interconnected with a hollow feed hose 34 which in turn is interconnected with a selector valve 36 operative to permit air 40 under pressure and/or organic solvent 42 to flow into the purging channel 27. Valve 36 can be closed completely to exclude solvent 42 and air 40 from entering the purging channel and also to close input opening 30 to prevent flow of material discharged from the mold to flow through entrance channel 28, but rather the same is forced out discharge opening 32. The air which is discharged from the mold will contain some debris, i.e., resin, which is deposited in the discharge channel 29, especially during the terminal portion of the mold charging cycle. The cleansing fluid, when utilized, will remove the deposited debris from purge channel 27. The fluid cleansing means is shown in FIG. 1 for clarity and it is understood that the purging and cleansing of the purge channel 27 occurs while the vent pin 24 is extended and the vent opening 12 is closed as shown in FIG. 1. Sectional means shown in FIG. 3 further illustrate the purging channel 27 where the vent pin 24 is retracted in the open position as shown in FIG. 2. As apparent from FIGS. 1 and 3, a longitudinal diameter 31 of the purge channel in the vicinity of vent pin is greater than the diameter of vent pin 24 thereby permitting air 40 and/or solvent 42 to flow into entrance channel 28, around vent pin 24, and through debris discharge channel 29. Vent apparatus 10 also has a cooling jacket therein.

Figure 4:
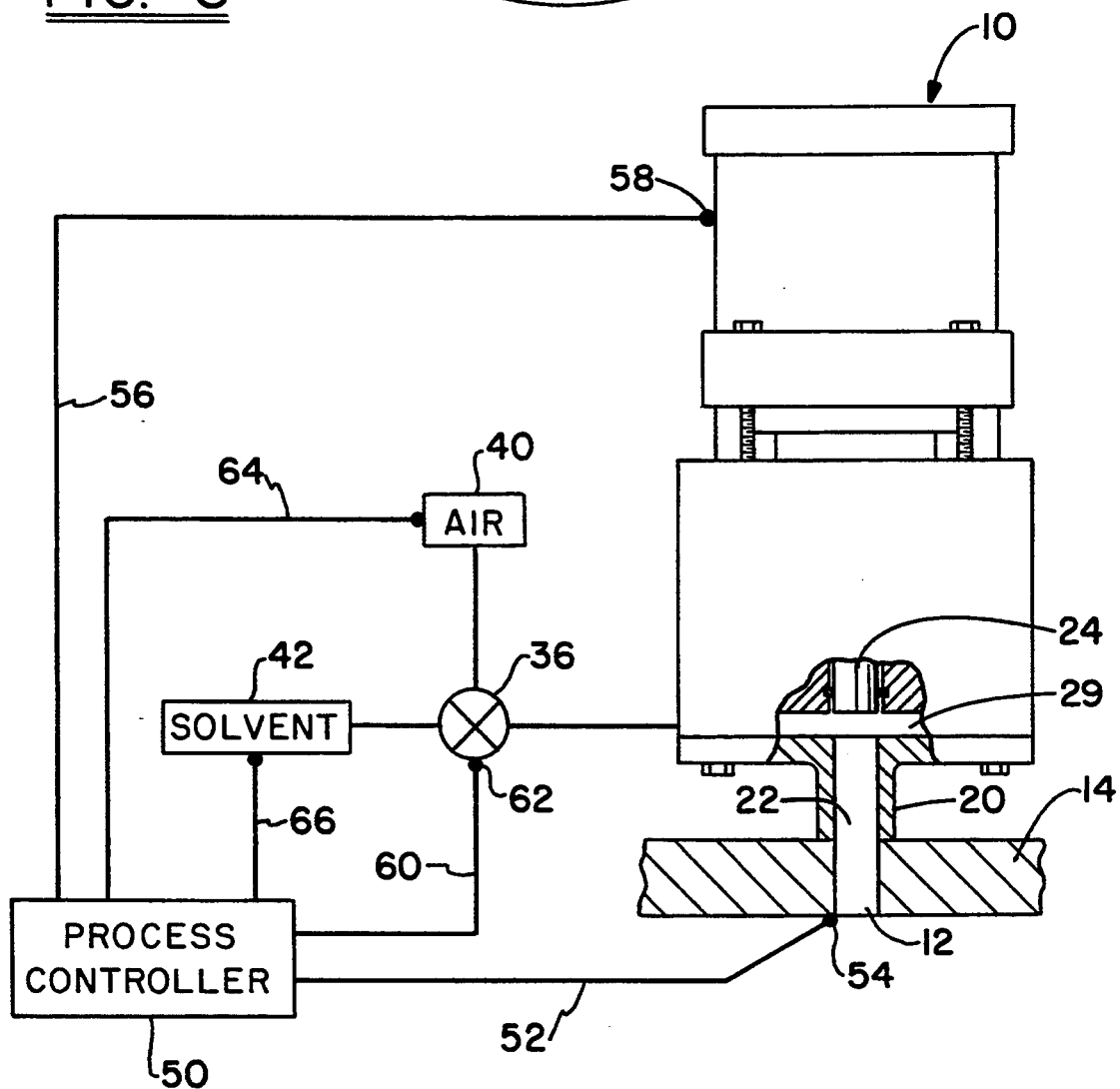
FIG. 4 is a schematic of a process controller system for automatically activating various operating parts of the vent apparatus of this invention shown in FIG. 1.

FIG. 4 shows a process controller 50 having an electrical lead 52 connected to an electronic resin sensor 54 adapted to measure the liquid resin level within the mold cavity 16 where excess charged liquid resin enters through the vent opening 12 and commences entry into the vent channel 22 thereby activating the process controller 50 to shut the vent opening 12. The electronic signal sent to the process controller 50 in turn activates the reciprocating means through lead line 56 to an electronic activating means 58 for actuating the reciprocating means and extending the movement of the vent pin 24 to close the vent opening 12 as shown in FIG. 1. The process controller is then programmed to open the valve 36 by controller lead line 60 and activating means 62 in conjunction With activating the air source 40 or the organic cleaning solvent source 42. Process controller lead line 64 activates the air source 40 while controller lead line 66 activates the organic solvent where either cleansing fluid can be used alone or in programmed sequence, or together, if desired, to clean resin particles and other debris from the discharge channel section 29. The purging process of the discharge channel section 29 takes place while the vent opening 12 is closed and liquid resin in the mold cavity 16 is hardened into a molded plastic article. After the molding cycle is completed, the mold halves are separated and the molded part is removed while the process controller 50 automatically reverses movement of the reciprocating means to retract the vent pin 24 and open the vent opening 12 in preparation for liquid resin injection into the mold cavity 16 in a subsequent molding cycle.

In accordance with the process of this invention, displaced air is vented from the closed mold 14 by controlling air expulsion with a reciprocating vent apparatus 24 retracted to the open position while charging liquid resin to the mold cavity 16; automatically sensing the liquid resin level within the mold cavity 16, and automatically closing the vent opening 12 in response to the liquid resin entering the vent opening 12 by extending the reciprocating vent pin 24; and purging the vent apparatus of debris by automatically activating passage of cleansing fluid through the debris discharge channel 29 while the vent opening 12 remains closed, as shown in FIG. 1.

In lieu of the above described automatic system, other automatic systems can be utilized as well as semi-automatic, and even manual systems, for activating the reciprocating vent pin, the selector valve, and the like.

One or more vent units of this invention can be used on a single closed mold where a plurality of vents can be operated, e.g., closed, in a predetermined sequence or each independently in response to individual resin sensors for each vent opening 12. Air in the mold is effectively displaced and completely forced out through the vent units thereby producing defect-free molded articles. The process controller 50 can be programmed to automatically close all vent openings 12 at an appropriate time so that a suitable internal cavity pressure can be developed, or so that no pressure exists. The plurality of vents can be sequentially opening and closed in some predetermined manner in order to achieve proper and complete filling of the mold cavity 16. As noted, after the vent openings 12 are closed, the process controller activates fluid cleansing of the debris discharge channel 29. Cleansing advantageously flushes out resin particles and other debris before the resin is allowed to cure or otherwise harden and set-up within the debris discharge channel 28.

While in accordance with the patent statutes the best mode and preferred embodiment has been set forth, the scope of the invention is not limited thereto, but rather by the scope of the attached claims.

WHAT IS CLAIMED IS:

1. A mold wherein a liquid molding resin is injected into a closed mold cavity where the liquid resin is hardened in the mold, said mold having at least one vent opening communicating with a venting means for expelling air from the mold cavity the improvement comprising;

said venting means comprising a vent tube having an interior channel communicating with the vent opening in the closed mold and with a debris discharge channel;

a reciprocating means having a reciprocating vent pin slidably engaging the interior channel of the vent tube, the vent pin being operative to extend and close the vent opening and to retract and open the vent opening; and a purging channel interconnected and communicating with the interior channel of the vent tube and with said discharge channel.

2. The mold of claim 1, wherein the venting means is activated by a liquid resin sensor means for sensing the liquid resin level in the mold cavity and operative in response to liquid resin entering the vent opening of the mold to extend the vent pin and close the vent opening in the mold.

3. The mold of claim 1, wherein the venting means includes means to actuate a cleansing fluid source to circulate cleansing fluid through the purging channel and debris discharge channel when the vent pin is extended to close the vent opening in the mold.

4. The mold of claim 3, wherein the cleansing source is air under pressure.

5. The mold of claim 3, wherein the cleansing source is an organic solvent.

6. The mold of claim 1, wherein the reciprocating means comprises a pneumatic cylinder inter-connected with the vent pin.

7. The mold of claim 6, wherein the vent pin has essentially the same diameter as the vent tube.

8. The mold of claim 3 wherein the mold contains a plurality of venting means wherein each venting means is interconnected and communicates with a separate vent opening in the mold.

* * * * *